(No Model.) 4 Sheets—Sheet 1.

C. N. LEONARD.
STRAW STACKER.

No. 334,402. Patented Jan. 12, 1886.

WITNESSES.
Chas. L. Thurber.
H. W. Mallett.

INVENTOR.
Chas. N. Leonard,
PER
C. Bradford,
ATTORNEY.

(No Model.) 4 Sheets—Sheet 2.
C. N. LEONARD.
STRAW STACKER.
No. 334,402. Patented Jan. 12, 1886.
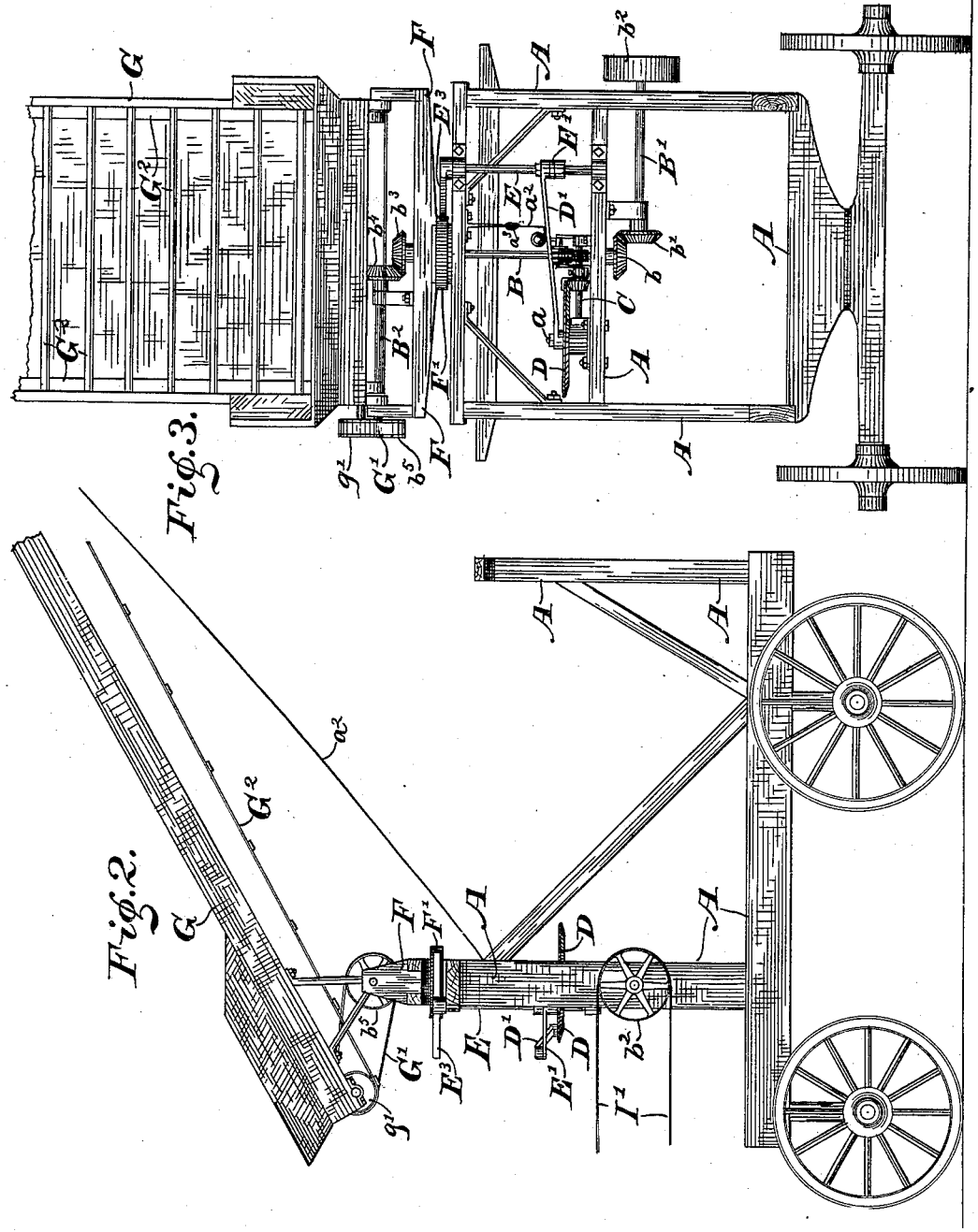
WITNESSES.
INVENTOR.

(No Model.) 4 Sheets—Sheet 3.
C. N. LEONARD.
STRAW STACKER.
No. 334,402. Patented Jan. 12, 1886.
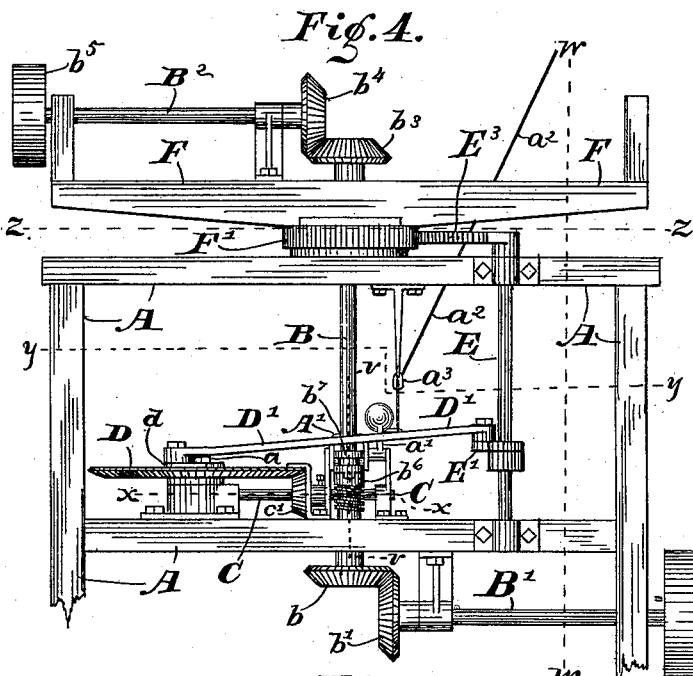
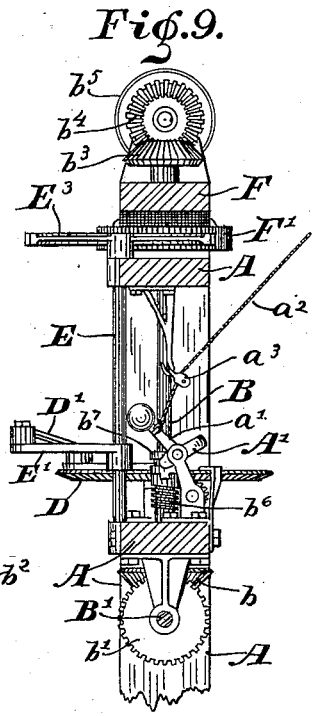
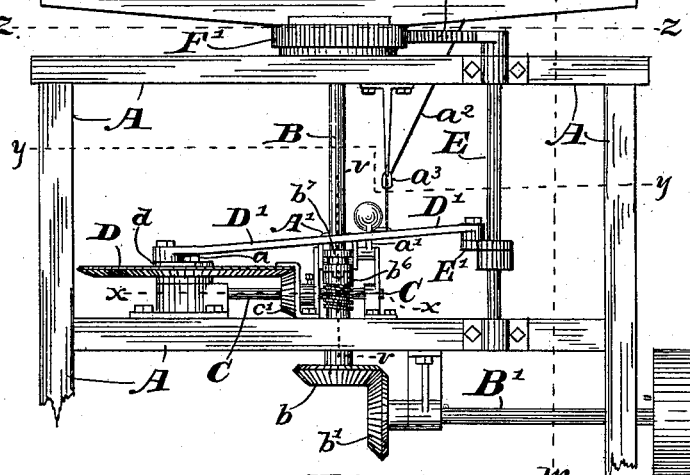
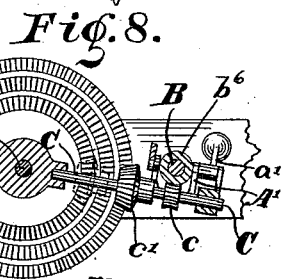
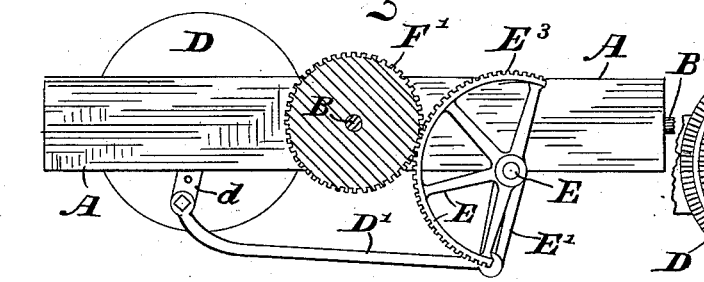
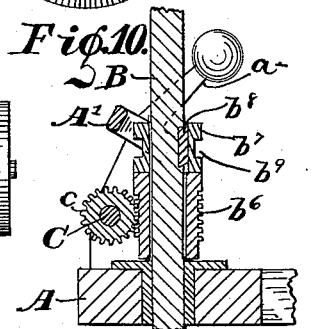
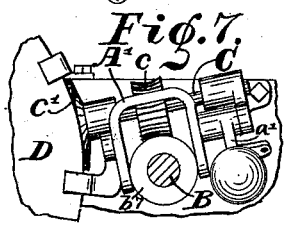
WITNESSES.
Chas. L. Thurber.
H. W. Mallett.
INVENTOR.
Chas. N. Leonard,
PER C. Bradford.
ATTORNEY.

(No Model.)

4 Sheets—Sheet 4.

C. N. LEONARD.
STRAW STACKER.

No. 334,402.   Patented Jan. 12, 1886.

WITNESSES.
Chas. L. Thurber
H. W. Mallett

INVENTOR.
Chas. N. Leonard,
PER C. Bradford,
ATTORNEY.

UNITED STATES PATENT OFFICE.

CHARLES N. LEONARD, OF INDIANAPOLIS, INDIANA, ASSIGNOR OF ONE-HALF TO CHESTER BRADFORD, OF SAME PLACE.

STRAW-STACKER.

SPECIFICATION forming part of Letters Patent No. 334,402, dated January 12, 1886.

Application filed September 4, 1884. Serial No. 142,225. (No model.)

*To all whom it may concern:*

Be it known that I, CHARLES N. LEONARD, of the city of Indianapolis, county of Marion, and State of Indiana, have invented certain new and useful Improvements in Straw-Stackers, of which the following is a specification.

The object of my said invention is to produce a straw-stacker the carrier of which will automatically travel from side to side during the operation of the stacker, and thus distribute the straw regularly and evenly over a large surface, thereby obviating the labor of moving by hand either the straw-carrier or the straw, which has heretofore been necessary. This object is accomplished by providing mechanism in connection with the driving mechanism, whereby the yoke upon which the lower end of the straw-carrier is mounted is regularly swung back and forth upon its central pivot, thus causing the straw-carrier to travel through the arc of a circle, as will hereinafter be more particularly described.

Figure 1:
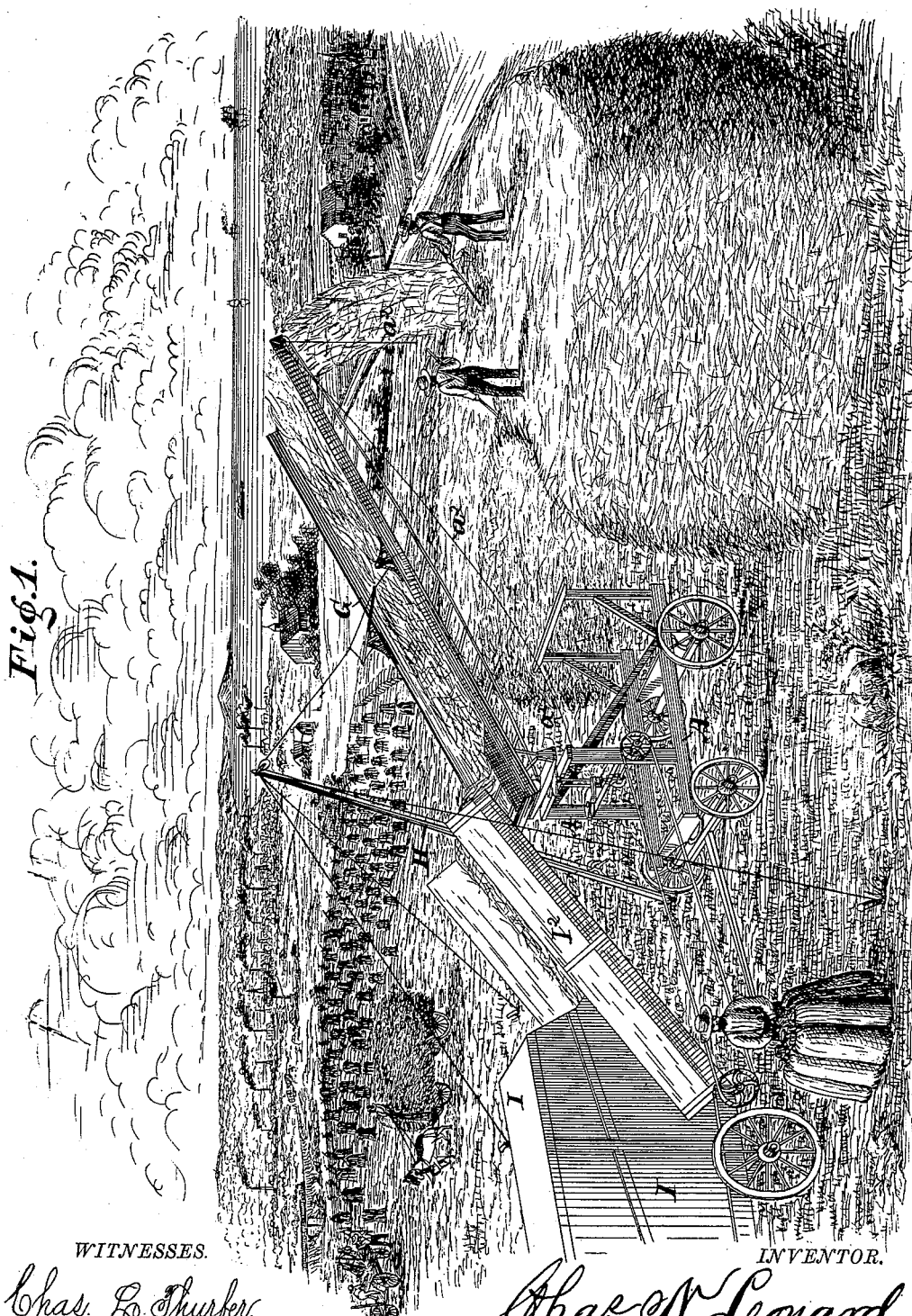

Referring to the accompanying drawings, which are made a part hereof, and on which similar letters of reference indicate similar parts, Figure 1 is a perspective view of a straw-stacker in use provided with my improvements; Fig. 2, a side elevation of the stacker mechanism, and also part of the carrier; Fig. 3, a front elevation of the same; Fig. 4, a detail view similar to a portion of Fig. 3, on an enlarged scale; Fig. 5, a horizontal sectional view, looking downwardly from the dotted line $z\ z$ in Fig. 4; Fig. 6, a similar view, looking downwardly from the dotted line $y\ y$ in Fig. 4; Fig. 7, a detail view similar to a portion of Fig. 6, on an enlarged scale; Fig. 8, a horizontal sectional view, looking upwardly from the dotted line $x\ x$ in Fig. 4; Fig. 9, a vertical sectional view, looking to the left from the dotted line $w\ w$ in Fig. 4; Fig. 10, a detail sectional view, looking to the right from the dotted line $v\ v$ in Figs. 4 and 6; Figs. 11 to 17, views illustrating substitute constructions of the mechanism peculiar to my invention, and Figs. 18 and 19 views illustrating substitute constructions of the means for connecting the rock-shaft to the straw-carrier yoke.

In said drawings, the portions marked A represent the frame-work of the straw-stacker; B, the principal shaft of the straw-carrier mechanism; C, the primary shaft of the mechanism constituting my present invention; D, a crank-wheel or wheel carrying a crank driven by a pinion on said shaft; E, a rock-shaft, the upper end of which is provided with means for engaging with and driving the yoke on which the carrier is mounted; F, said yoke; G, said carrier; H, the derrick whereby the carrier is supported, and I a thrashing-machine.

The frame-work A is simply a suitably-constructed frame-work for the purpose, and serves to support the carrier and the mechanism by which the same is driven and operated.

The principal shaft B is simply the usual vertical shaft, mounted within or upon cross-bars in said frame-work, and is driven by a horizontal shaft, B', and miter gear-wheels $b$ and $b'$, connecting them, said shaft B' being driven by a belt, I', running to the pulley $b^2$ thereon from a suitable pulley upon a shaft of the thrashing-machine I. Said shaft B drives the horizontal shaft B², through miter gear-wheels $b^3$ and $b^4$, which, through a belt, G', and pulleys $b^5$ and $g'$, drives the endless traveling apron G² of the straw-carrier, in the usual manner. Said shaft B also has the pinion $b^6$, (preferably a screw-pinion,) through which it drives the mechanism peculiar to my invention, and a clutch, $b^7$, which engages therewith and causes it to rotate with said shaft, and which, when disengaged, permits the shaft to revolve loosely within it, and thus allow the mechanism peculiar to this invention to remain idle. This clutch $b^7$ (see particularly Figs. 4, 6, 7, 9, and 10) is adapted to move up and down on said shaft B loosely, but is revolved at all times thereby, by means of the spline $b^8$, or some such equivalent device. This clutch is operated by the pivoted frame A', mounted on the frame-work alongside of said shaft, which passes astride of said clutch and is provided with projecting points which enter a circumferential groove, $b^9$, therein. Upon this frame A', and extending out at an angle with the arms thereof, is a weighted lever, $a'$, which operates to hold said clutch into engagement with the clutch-face formed on the upper end of the gear-wheel $b^6$, when in the position shown in the drawings. When thrown over into the other position, which may be readily done by means of the rope $a^2$, or otherwise, the clutch is raised up out of engagement with said gear-wheel, and said gear-wheel is thus permitted to remain idle, while the shaft B continues to revolve, and thus the mechanism peculiar to this invention allowed to remain motionless. This clutch is thrown out of and into engagement with the screw-gear $b^6$ in the following manner: The rope $a^2$ passes up through a sheave, $a^3$, above the pivots upon which the frame A' is mounted, (see especially Figs. 1 and 9,) and along underneath the straw-carrier to the extreme end, where it passes over another sheave and down to a point where it can be reached by the men stacking the straw. If it is desired to stop the travel of the straw-carrier at any time, the men on the straw-stack, by giving this rope a smart pull, can throw the weighted arm over to the opposite side of the pivots on which it and the frame are mounted from that in which it is shown in the drawings, which will raise the clutch up out of engagement with the gear-wheel, and thus stop the operation of the mechanism. When it is desired that the straw-carrier shall resume its travel, a like pull throws the weighted lever back into position, re-engaging the clutch with the gear-wheel, and again setting the device in motion.

The shaft C is mounted in bearings upon the frame-work, and has mounted thereon a gear-wheel, $c$, (preferably a screw-gear,) which engages with the gear-wheel $b^6$, by which it is driven, and a bevel-pinion, $c'$, through which it drives the wheel D. Instead of the screw-gear shown in the principal drawings, toothed gearing of various kinds may be substituted without departing from my invention, as shown in Figs. 11 to 17, which will be hereinafter more fully described. This shaft may be dispensed with altogether by the arrangement shown in Figs. 10, 12, and 17; but I regard the construction wherein it is employed as preferable.

The crank-wheel or crank D is mounted on a shaft, $a$, mounted upon or secured to the frame-work A, and is adapted to be revolved thereon or therewith by the pinion $c'$, as just described. To the top of this wheel, or to the crank-arm $d$, rigidly secured thereto, is connected a connecting-rod, D', which is connected at the other end to a similar crank-arm, E', upon the shaft E. Thus, as said wheel D revolves, said shaft E is given a partial rotation, first in one direction and then in the other, and thus becomes a rock-shaft. The distance which this shaft shall move is determined by the adjustment of the connecting-rod D' at the points where it is attached to the crank-arms $d$ and E', said crank-arms being provided with slots or a series of holes, through which the bolts which connect said connecting-rod thereto pass, and thus adapted to be adjusted in or out, as may be desired. In the drawings a series of holes is shown in the crank-arms $d$ and a slot in the crank-arm E'. (See particularly Fig. 6.) The speed at which this wheel D shall travel is determined by an adjustment of the bevel-pinion $c'$ on the shaft C, said wheel D being provided with several rows of teeth, as shown in Fig. 8, with either of which said pinion is adapted to engage. This adjustment is effected, when desired, by removing the fastening which holds the wheel D down onto its bearing, raising said wheel, and slipping said pinion along on the shaft to the point desired, as will be readily understood.

Figure 18:
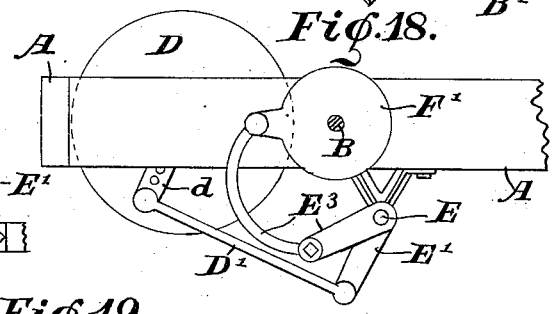

The rock-shaft E passes up alongside of the cross-timbers of the frame A and rests in bearings thereon. It carries the crank-arm E', just described, and a toothed segment, $E^3$, which engages with the spur-gear wheel F', which is rigidly attached to the yoke F. By this means when the rock-shaft E is in motion said gear-wheel and the yoke thereon are caused to partially revolve on their pivot, and with them the straw-carrier, thus accomplishing the object of my invention. Instead of this spur-gear wheel, as shown in the principal drawings, crank-arms might be connected to the rock-shaft and the yoke, and said crank-arms connected by a connecting-rod or link, as shown in Fig. 18. As the travel of the rock-shaft E is unequal, owing to the fact that the crank $d$ twice in each revolution passes a dead-center, it may be found desirable to use oval instead of round gearing, as shown in alternate view, Fig. 19.

The yoke F, the carrier G, and the derrick H may be of any suitable construction. I have selected the forms shown as well adapted for my purpose, and not as forming of themselves any part of my said invention. Being simple, and easily understood, they will not be further described herein.

The thrashing-machine I may of course be any ordinary thrashing-machine. It is provided with the ordinary short straw-carrier, $I^2$, attached thereto, which delivers the straw from the machine to the straw-stacker, and also with a proper shaft and pulley, by which, through the belt I', said straw-stacker is operated.

Figure 11:
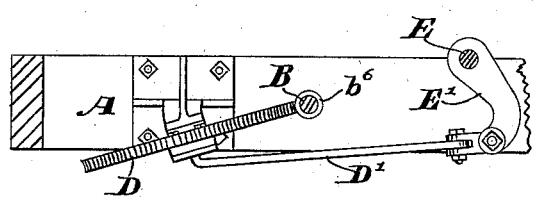
Figure 12:
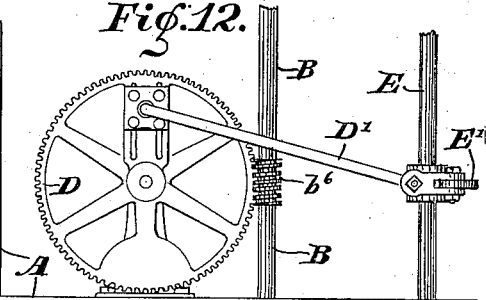

Referring again to the substitute constructions, Figs. 11 and 12 illustrate one where the crank-wheel D, instead of being mounted on a vertical shaft, as in the principal construction, (see particularly Fig. 4,) is mounted on a horizontal shaft, and is arranged to engage directly with the screw-pinion $b^6$ on the shaft B. The connecting-rod D', in this case, instead of being connected to the wheel D by a wrist-pin, is connected by a universal or ball-and-socket joint, and is also connected to the crank E' by a universal joint, this being rendered necessary by the different movements of said connecting-rod.

Figures 13, 15, 17:
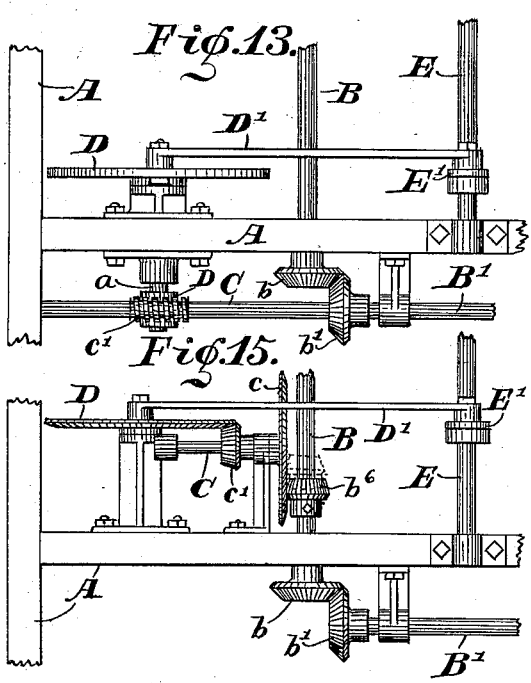

Fig. 13 illustrates a construction wherein the wheel D is practically divided into two wheels—one above and the other below the bearing—and instead of the shaft C being an independent shaft it is a continuation of the shaft B', and the pinion $c'$ thereon engages with the screw gear-wheel (forming, as above stated, practically, part of the wheel D) upon the lower end of the shaft a, which shaft in this case extends down through the frame A instead of resting upon it, as in the principal construction.

Figure 14:
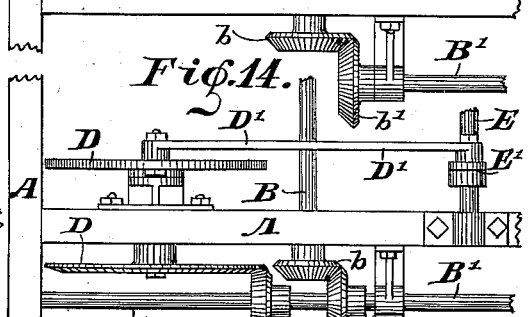

In Fig. 14 is illustrated a construction wherein bevel gear-wheels are substituted for the screw-gearing c' D shown in Fig. 13. In the construction illustrated in this figure, as also that illustrated in Fig. 13, the upper part of the wheel D might be a crank, instead of a wheel, as there is no gearing on this part.

In Fig. 15 is illustrated a construction wherein the shaft C is used as in the principal construction, and where bevel gear-wheels are substituted for the screw-gearing.

Figure 16:
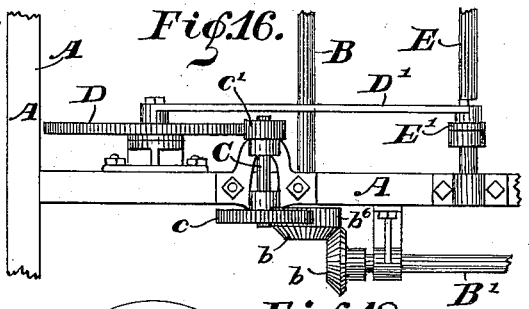

In Fig. 16 is illustrated a construction wherein the shaft C is transferred from a horizontal to a vertical position, and the connection is made by spur-gears, instead of bevel-gears.

In Fig. 17 is illustrated a construction wherein the connection is made directly between the shaft B and the wheel D by means of spur-gears, the change in speed being effected, when desired, by making the spur-gear on the shaft B in the form of a cone-pulley, and making the shaft of the wheel D adjustable in position.

These several figures are introduced to illustrate the fact that it is immaterial what form of gearing is employed, so far as my invention is concerned, so long as the result is to impart the required reciprocal motion to the straw-carrier.

Fig. 18 illustrates a construction wherein cranks and a connecting rod or link are substituted for the segment E³ and spur gear-wheel F' as a means of connecting the rock-shaft to the yoke.

Figure 19:
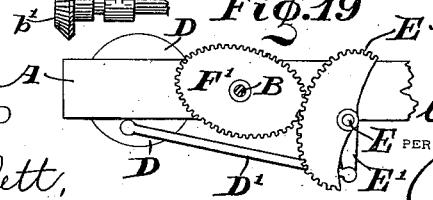

Fig. 19 simply illustrates the use of oval instead of round gearing in making this last-described connection.

The operation of my said invention may be briefly recapitulated, as follows: The straw being delivered to the carrier, forming part of the straw-stacker, is carried thereby and delivered onto the straw-stack, as illustrated in Fig. 1. The mechanism composed of the shaft C, wheel or crank D, connecting-rod D', shaft E, and the various pinions, crank-arms, and gearing drive the yoke F and the carrier G regularly back and forth through the arc of a circle, thus delivering the straw into a similarly-formed stack, as shown in said Fig. 1. By this means all the labor of moving the straw-carrier around from one position to another, which has heretofore been performed by hand, is avoided, and a considerable saving thereby effected.

Having thus fully described my said invention, what I claim as new, and desire to secure by Letters Patent, is—

1. The combination, with the driving-gear of a straw-stacker and the yoke or base of the straw-carrier thereof, of intermediate mechanism consisting of a crank or crank-wheel driven by said driving-gear, a rock-shaft, a connection between said crank-wheel and said rock-shaft, and a connection between said rock-shaft and said yoke or base of the carrier, whereby said carrier is automatically driven back and forth through the arc of a circle, and the straw thus delivered over a large space, substantially as set forth.

2. The combination of the principal shaft of the carrier mechanism, a crank-wheel, gearing through which said shaft drives said crank-wheel, a rock-shaft, a connecting-rod connecting said crank-wheel and said rock-shaft, the straw-carrier, and a connection between said rock-shaft and the yoke of said carrier, whereby said carrier is alternately moved in one direction and the other, substantially as set forth.

3. The combination, in a straw-stacker, of a crank-wheel, gearing for driving the same, a rock-shaft, a connecting-rod connecting said crank-wheel and said rock-shaft, the straw-carrier, and the connection between said rock-shaft and said straw-carrier, whereby said carrier is driven by said rock-shaft, substantially as set forth.

4. The combination, in a straw-stacker, of the principal shaft B, the driving-shaft B', the shaft C, the crank-wheel D, gear-wheels connecting said several parts, the connecting-rod D', rock-shaft E, the yoke or frame-work on which the straw-carrier is mounted, and gearing connecting said rock-shaft and said yoke or frame-work.

5. The combination, in a straw-stacker, of the principal shaft B, a crank-wheel, D, intermediate gearing connecting them, the rock-shaft, and a connection between said rock-shaft and said crank-wheel, said rock-shaft being geared, as specified, to the straw-carrier, whereby it is adapted to move said straw-carrier back and forth through the arc of a circle, substantially as set forth.

6. The combination, in a straw-stacker, of the principal shaft, a pinion, $b^6$, thereon, a shaft, C, having a wheel which engages with said pinion, and a pinion which engages with the crank-wheel D, said crank-wheel being provided with several rows of cogs, and said pinion adapted to be moved on the shaft C and engage with any of them, whereby the speed of said crank-wheel may be varied, substantially as set forth.

7. The combination, in a straw-stacker, of the principal shaft B, a single gear-wheel thereon, the mechanism for moving the straw-carrier back and forth through the arc of a circle, and a clutch, $b^7$, mounted on said shaft, which is adapted to engage with said gear-wheel or to be disengaged therefrom, and thus cause said gear-wheel to revolve or permit it to remain stationary, substantially as set forth.

8. The combination, in a straw-stacker, of the straw-carrier, a shaft having a gear-wheel, $b^6$, (for operating the straw-carrier, as specified,) loosely mounted thereon, a clutch mounted on said shaft and adapted to engage with and lock said gear-wheel in position, a pivoted frame, A', having a weighted arm, a', and a cord or rope, a², connected thereto and running to the extreme end of the straw-carrier, whereby said clutch may be disengaged and re-engaged by the workmen on the straw-stack, substantially as set forth.

9. The combination, in a straw-stacker, of a rock-shaft, E, mechanism for operating the same, a spur-segment, E³, on said shaft, the yoke F, having a spur-gear wheel, F', rigidly secured thereto, and the straw-carrier, substantially as set forth.

10. The combination, in a straw-stacker, of the frame A, the shafts B, B', B², C, and E, the crank-wheel D, the crank-arm E', the connecting-rod D', the yoke F, the gearing connecting said several parts, and the carrier G, substantially as set forth.

In witness whereof I have hereunto set my hand and seal, at Indianapolis, Indiana, this 30th day of August, A. D. 1884.

CHAS. N. LEONARD. [L. S.]

In presence of—
C. BRADFORD,
CHARLES L. THURBER.